A. KINGSBURY.
THRUST BEARING.
APPLICATION FILED AUG. 29, 1917.

1,378,545.

Patented May 17, 1921.

Inventor
Albert Kingsbury
By his Attorneys
Marshall & Dearborn

UNITED STATES PATENT OFFICE.

ALBERT KINGSBURY, OF PITTSBURGH, PENNSYLVANIA.

THRUST-BEARING.

1,378,545.  Specification of Letters Patent.  Patented May 17, 1921.

Original application filed March 25, 1916, Serial No. 86,535. Divided and this application filed August 29, 1917. Serial No. 188,726.

*To all whom it may concern:*

Be it known that I, ALBERT KINGSBURY, a citizen of the United States of America, and a resident of Pittsburgh, Allegheny county, and State of Pennsylvania, have invented certain new and useful Improvements in Thrust-Bearings, of which the following is a specification, reference being had to the accompanying drawings, forming a part thereof.

My invention relates to bearings and particularly to thrust bearings which embody segmental bearing shoes or members adapted to tilt in response to the wedging action of the oil when the bearing is in service.

This application is a division of my copending application Serial No. 86,535 filed March 25, 1916, for thrust bearings.

An object of my invention is to provide a bearing, such as a thrust bearing, with an annularly arranged plurality or set of bearing segments and means tiltable about a single axis for equitably distributing the bearing pressure thereon.

Another object of my invention is to provide a bearing with an annular equalizing member which is adapted to tilt about a single axis and a plurality of bearing segments or shoes so mounted on said member that the bearing pressure on said segments is equitably distributed by said member.

Another object of my invention is to provide a bearing with an annular equalizing member as aforesaid and a plurality of bearing segments or shoes mounted thereon to tilt, preferably both circumferentially or tangentially and radially of the bearing.

Another object of my invention is the production of a very simple and easily constructed bearing of the aforesaid character which will automatically and effectively equalize the bearing pressure on all portions of the bearing surface even when the bearing segments or shoes are carelessly machined and vary by a considerable amount in relative thickness; and notwithstanding any inaccuracies in the original fitting, or greatly unequal wear in use, or the heating effects arising during normal operation which are likely to crown the surface of the thrust collar with which the segments or shoes coöperate.

Another object of my invention is to provide a bearing comprising a pair of bearing shoes disposed on opposite sides of the axis of the bearing and means tiltable about a single axis for distributing the pressure on said bearing segments or shoes.

Other objects and advantages of my invention will be set forth hereinafter, and in order that my invention may be thoroughly understood I will now proceed to describe the same in the following specification, and then point out the novel features thereof in appended claims.

The invention is capable of receiving a variety of mechanical expressions one of which is shown on the accompanying drawings, but it is to be expressly understood that the drawings are for purposes of illustration only and are not to be construed as a definition of the limits of the invention, reference being had to the appended claims for that purpose.

Referring to the drawings.

Figure 1:
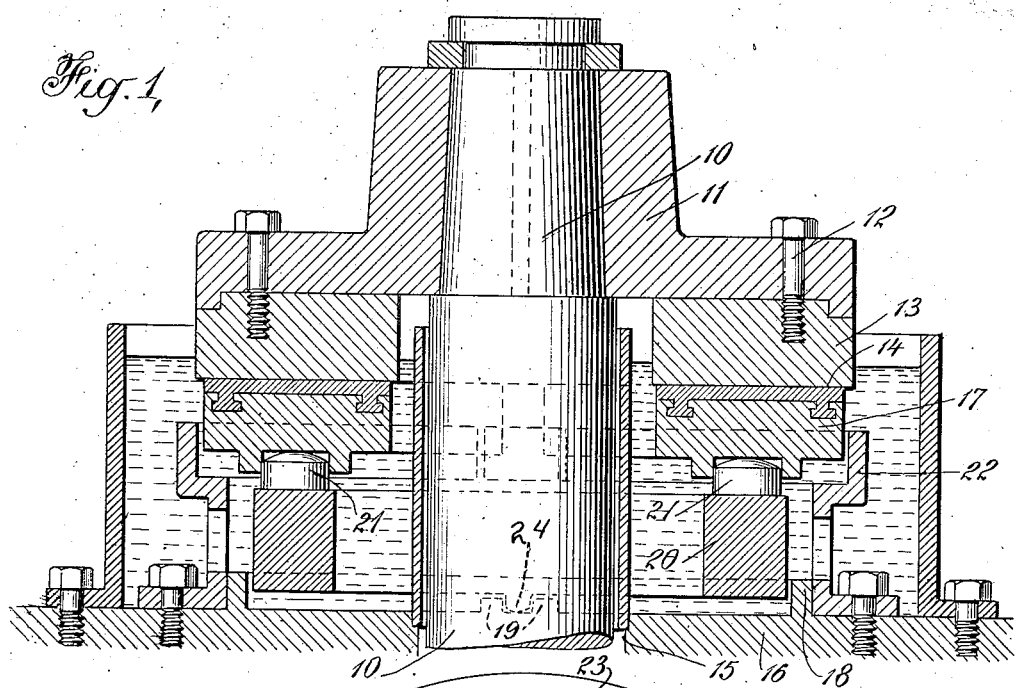
Figure 1 is a sectional elevation of a thrust bearing which constitutes an embodiment of my invention.
Figure 2:
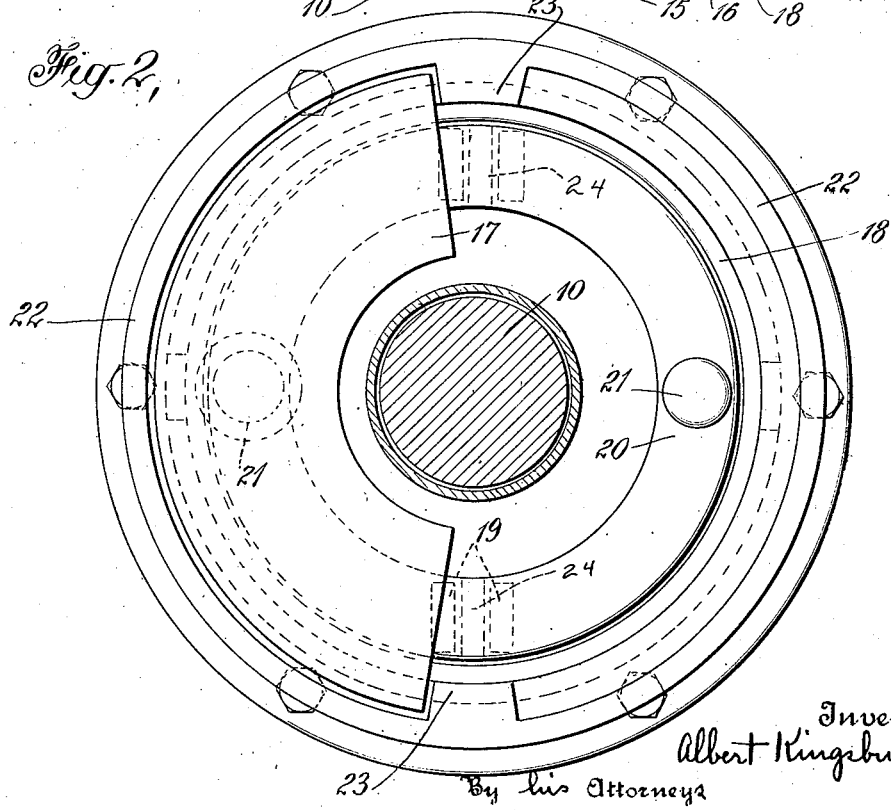
Fig. 2 is a partially sectional plan view of the same.

In the structure illustrated, 10 is a substantially vertical shaft to which a thrust block 11 is attached. Removably secured to the thrust block by bolts 12 or other suitable means, is a thrust collar 13 having a bearing surface 14.

The shaft 10 extends through an opening 15 in a stationary frame or foundation 16 and the thrust collar 13 coöperates with a plurality of bearing segments or shoes 17, shown as two in number in the embodiment illustrated, mounted on pressure distributing means on said frame or foundation. In the form shown, the base 16 has an annular centering ring 18 and alined pairs of projections 19. Mounted on said base and centered by said annular rib 18 is a pressure distributing or equalizing member 20 which extends about or embraces the shaft 10 and is preferably of annular formation. Said member 20 has diametrically opposed rocking or knife-edge supports 24 that engage said base 16 between the projections 19, and a pair of upwardly extending spherically faced projections 21 located on opposite sides of the axis of the bearing and on opposite sides of the tilting axis of the member 20, the line of the projections 21, in the embodiment shown, being at right angles to the axis of the rocking supports 24.

The bearing shoes or segmental members 17 are mounted to tilt both circumferentially and radially of the bearing on the projections 21 and are held in place by an annular guide 22 which is provided with projections 23.

The tiltable bearing shoes and equalizer ring are shown as parts of the stationary member of the structure but they may of course be associated with the movable member if desired.

The axis of the shaft may be inclined or horizontal instead of vertical and various changes may be made in the form, arrangement and details of construction within the spirit and scope of my invention.

What I claim is:

1. A thrust bearing comprising an equalizing member mounted to tilt about an axis extending through the axis of the bearing, and a pair of bearing shoes tiltably mounted on said member, one on each side of the bearing axis, on a line at right angles to the pivotal axis of said member.

2. A thrust bearing comprising a rotatable member, a continuous annular equalizer mounted to tilt about one axis at right angles to the axis of the rotatable member and having a pair of projections disposed on opposite sides of the axis of the rotatable member, and a pair of bearing shoes tiltably mounted on said projections.

3. A thrust bearing comprising a rotatable shaft, a thrust collar thereon, a continuous annular equalizer through which the shaft extends mounted to tilt on one axis at right angles to the shaft, and a pair of bearing shoes adapted to coöperate with the thrust collar and tiltably mounted on the annular equalizer at points on opposite sides of the shaft and in quadrature relationship to the equalizer supports.

4. A thrust bearing comprising an annular equalizing member having a knife edge support, and bearing shoes tiltably mounted on said member on opposite sides of the knife edge support and arranged to tilt both radially and tangentially.

5. A thrust bearing comprising an annular equalizing member having a transverse knife edge support, and bearing shoes mounted thereon and arranged to tilt relatively thereto.

6. A thrust bearing comprising an annular equalizing member having a knife edge support, and bearing shoes mounted thereon on opposite sides of said support.

7. A thrust bearing comprising an annular equalizing member having a knife edge support, and bearing shoes mounted thereon on opposite sides of the line of support and arranged to tilt relatively thereto.

8. A thrust bearing comprising a shaft having a thrust bearing member and a relatively stationary coöperating bearing member, one of said members comprising an annular equalizing member substantially concentric with the shaft and mounted on a knife edge support, and a pair of bearing shoes tiltably mounted thereon on opposite sides of the knife edge support.

9. A thrust bearing comprising a shaft having a thrust bearing member and a relatively stationary coöperating bearing member, one of said members comprising an annular equalizing member substantially concentric with the shaft and mounted on a knife edge support, and a pair of bearing shoes mounted for both radial and tangential tilting on the equalizing member on opposite sides of the knife edge support.

10. A bearing comprising an annular pressure-distributing member tiltably mounted on a single axis, and bearing segments mounted on said member on opposite sides of said axis and adapted to tilt both radially and tangentially.

11. A bearing comprising an annular pressure-distributing member tiltably mounted on a single axis, and bearing segments mounted thereon to tilt relatively thereto.

12. A bearing comprising an annular pressure-distributing member tiltably mounted on a single axis, and bearing segments mounted on said member on opposite sides of said axis.

13. A bearing comprising an annular pressure-distributing member tiltably mounted on a single axis, and bearing segments mounted on said member on opposite sides of said axis and adapted to tilt relatively thereo.

14. A thrust bearing comprising an annular equalizing member having a knife-edge support, and diametrically-opposed bearing shoes mounted thereon and adapted to tilt relatively thereto.

15. A thrust bearing comprising an annular equalizing member having a knife-edge support, and diametrically-opposed bearing shoes tiltably mounted thereon on opposite sides of said line of support.

16. Pressure-distributing means for thrust bearings comprising an annular member provided with diametrical projections whereby the same may tilt about a single axis.

17. In a thrust bearing, the combination of relatively rotatable bearing members including bearing segments, and pressure-distributing means for mounting said segments comprising an annular member mounted to tilt on a single axis.

18. In a thrust bearing, the combination of relatively rotatable bearing members including bearing segments, and pressure-distributing means for mounting said segments comprising annular means mounted to tilt on a single axis and on which said segments are mounted on opposite sides of said axis.

19. In a bearing, relatively rotatable bearing members comprising opposed bearing segments, and a common annular equalizing member for said segments tiltable on one axis.

20. In a bearing, relatively rotatable bearing members comprising two opposed bearing segments, and an annular equalizing member for said segments mounted to rock about a single diametrical axis.

21. In a bearing, relatively rotatable bearing members comprising opposed bearing segments, an annular equalizing member for said segments mounted to rock on a single axis, and means intermediate said member and segments for tiltably mounting said segments.

22. In a bearing, relatively rotatable bearing members comprising opposed bearing segments, an annular equalizing member for said segments mounted to rock on a single axis, and means intermediate said member and segments for mounting said segments to tilt both circumferentially and radially of the bearing.

23. In a bearing, relatively rotatable bearing members comprising two opposed bearing segments, and an annular equalizing member for said segments mounted to rock on a single axis, said segments being mounted on said member on a line at right angles to said axis.

24. In a bearing, relatively rotatable bearing members comprising two opposed bearing segments, an annular equalizing member for said segments mounted to rock on a single axis, and means intermediate said member and segments tiltably mounting said segments on a line at right angles to said axis.

25. An equalizing member for thrust bearings comprising an annular member provided with diametrical projections whereby it may rock on a single axis and also provided with projections for mounting bearing segments to tilt with respect thereto.

26. In a bearing, relatively rotatable bearing members comprising two bearing segments, and an annular equalizing member mounted to rock about a single axis and on which said segments are mounted at equal distances from said axis.

27. In a bearing, relatively rotatable bearing members comprising diametrically-opposed bearing segments, and an equalizing member mounted to rock about a single axis and on which said segments are mounted on a line at right angles to said axis.

28. In a bearing, relatively rotatable bearing members comprising diametrically-opposed bearing segments, and an equalizing member for said segments mounted to rock about a single axis.

29. In a bearing, relatively rotatable bearing members comprising diametrically opposed bearing segments, and an equalizing member for said segments mounted to rock about a single axis and on which said segments are tiltably mounted.

30. In a bearing, relatively rotatable bearing members comprising diametrically opposed bearing segments, and means for equalizing the pressure on said bearing segments mounted to tilt about a single axis.

31. In a shaft bearing, relatively rotatable bearing members comprising a plurality of bearing segments, and means extending about the shaft and adapted to rock on a single transverse axis for distributing the pressure among the several segments.

32. In a shaft bearing, relatively rotatable members comprising a plurality of bearing segments, and an equalizing structure embracing the shaft and on which said segments are tiltably mounted, said equalizing structure being mounted to tilt about a single axis.

33. In a bearing, relatively rotatable bearing members including an annular set of bearing segments and means tiltable about a single axis for equitably distributing the bearing pressure on said segments.

In witness whereof, I have hereunto set my hand this 27 day of August, 1917.

ALBERT KINGSBURY.